(12) United States Patent
Mahalingaiah et al.

(10) Patent No.: US 9,336,632 B2
(45) Date of Patent: May 10, 2016

(54) METHODS FOR GENERATING MULTIPLE DATA REPORTS IN VEHICLES

(71) Applicant: HONEYWELL INTERNATIONAL INC., Morristown, NJ (US)

(72) Inventors: Pradeep Mahalingaiah, Karnataka (IN); Ashwin Prabhakara, Karnataka (IN); Tom Williams, Glendale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/462,081

(22) Filed: Aug. 18, 2014

(65) Prior Publication Data

US 2016/0049019 A1   Feb. 18, 2016

(51) Int. Cl.
*G07C 5/08* (2006.01)
*B64D 45/00* (2006.01)

(52) U.S. Cl.
CPC ............... *G07C 5/085* (2013.01); *B64D 45/00* (2013.01); *G07C 5/0808* (2013.01); *B64D 2045/0085* (2013.01)

(58) Field of Classification Search
CPC .......... G07C 5/00; G07C 5/08; G07C 5/0808; G07C 5/0816; G07C 5/0841; G07C 5/085; B64D 45/00; B64D 2045/0085
USPC ..................... 701/33.4, 34.2, 34.4
See application file for complete search history.

(56) References Cited

U.S. PATENT DOCUMENTS

| | | | | |
|---|---|---|---|---|
| 5,761,625 A * | 6/1998 | Honcik | ............... | G06F 9/45508 340/963 |
| 7,065,433 B2 | 6/2006 | Basu et al. | | |
| 7,761,201 B2 * | 7/2010 | Avery | ................ | G07C 5/008 701/29.3 |
| 8,423,430 B2 * | 4/2013 | Avery | .................. | G06Q 10/087 705/28 |
| 8,959,007 B2 * | 2/2015 | Khella | .................... | G05B 17/02 703/13 |
| 9,128,798 B2 * | 9/2015 | Hoffman | ................... | G06F 8/65 |
| 2002/0143443 A1 * | 10/2002 | Betters | ................. | G01C 23/005 701/32.1 |
| 2007/0067074 A1 | 3/2007 | Lykken et al. | | |
| 2008/0291014 A1 | 11/2008 | Chigusa et al. | | |
| 2008/0319602 A1 | 12/2008 | McClellan et al. | | |
| 2010/0211581 A1 | 8/2010 | Kotski et al. | | |
| 2011/0276217 A1 | 11/2011 | Sim et al. | | |
| 2012/1307101 | 5/2012 | Khella | | |

(Continued)

FOREIGN PATENT DOCUMENTS

EP          2348488 A1     7/2011

OTHER PUBLICATIONS

737 Airplane Health Management Overview; Mar. 2013, Copyright 2013 Boeing.

(Continued)

*Primary Examiner* — Thomas Tarcza
*Assistant Examiner* — Tyler J Lee
(74) *Attorney, Agent, or Firm* — Ingrassia Fisher & Lorenz, P.C.

(57) ABSTRACT

Embodiments of the subject matter described herein relate generally to generating multiple, multivariant prognostic data reports in aircraft. A plurality of data collection requests, one from each of a plurality of stakeholders, is received at the aircraft. A unique portion of onboard memory is associated with each of the data collection requests. Concurrently, according to the associated data collection requests, parametric data is collected and recorded as a report into each one of the unique portions of memory associated with each data collection request.

17 Claims, 3 Drawing Sheets

(56) References Cited

U.S. PATENT DOCUMENTS

| | | |
|---|---|---|
| 2013/0066515 A1 | 3/2013 | Sudolsky et al. |
| 2013/0166135 A1* | 6/2013 | Dunsdon ............... B64F 5/0081 701/29.3 |
| 2013/0197721 A1 | 8/2013 | Gu et al. |

OTHER PUBLICATIONS

Peters, G. et al.; Bringing the Aircraft System Health Management Tool to Life Using the Informatica Tool Suite; Copyright United Technologies Corporation, 2013.

Osmanbhoy, M. Z. et al.; Development of Fault Detection and Reporting for Non-Central Maintenance Aircraft; IEEEAC Paper #1164, Version 5, Updated Jan. 6, 2010.

Spectralux Corporation; Spectralux avionics Dlink+; [retrieved from Internet http://www.spectralux.com/pages/dlink.html] May 16, 2014.

Teledyne Controls; Wireless GroundLink Quick Access Recorder FAQs; [retrieved from Internet http://www.teledyne-controls.com/productsolution/wirelesssgoundlink/goundlink_FAQ.asp] May 16, 2014; Copyright 2014.

EP Extended Search Report for Application No. 151804432 dated Jan. 29, 2016.

* cited by examiner

METHODS FOR GENERATING MULTIPLE DATA REPORTS IN VEHICLES

TECHNICAL FIELD

Embodiments of the subject matter described herein relate generally to methods for vehicle health maintenance and, more particularly, to the generation of multivariant prognostic data reports in aircraft.

BACKGROUND

Aircraft maintenance has evolved to include the monitoring and recording of aircraft-related data while an aircraft is in service. The aircraft data may be collected for individual parts or for entire systems, and is used for scheduling aircraft maintenance and providing insight into performance and troubleshooting (hence, prognostics). Often called "vehicle health management," or the onboard maintenance system (OMS), the collection and recording of aircraft data is typically centrally managed by an onboard software program that compiles the data into parametric data reports. More than eight thousand different aircraft parameters may be monitored and recorded in response to a data collection request.

A prognostic data collection request typically includes a selection of which data parameters to collect, when to collect each of the data parameters, and how the data is presented in a report. A primary stakeholder, such as the airline or the aircraft original equipment manufacturer (OEM), generally submits a single prognostic data collection request used to configure an onboard management system to generate a single, large, prognostic data report.

Secondary stakeholders, such as suppliers of parts, vehicle fleet operators, military and research personnel, and the like, may also have an interest in aircraft-related prognostic data. If a secondary stakeholder is permitted to submit a data collection request a-priori, the primary stakeholder may aggregate the secondary data collection request with the primary data collection request, creating a larger, unpartitioned, data collection request. However, issues such as confidentiality or licensing restrictions may be exacerbated by the inability to partition the data collection requests and prevent additional stakeholders from participating in aircraft prognostic data collection.

Additionally, if an interested secondary stakeholder is able to obtain a copy of the single data report from the primary stakeholder, the stakeholder must sort through the data report to cull the information that is relevant to the stakeholder's interest. Not only do secondary stakeholders have to deal with culling through the large and complex data report as received from the airline, but they are unable to modify the order or sequence of data collection to obtain a prognostic data report that is tailored to their interest. Finally, a given stakeholder may want different reports depending upon whether the stakeholder has a defense, space, air transport, business, regional, or general aviation focus, creating a need for multivariant prognostic reports.

Consequently, a method or system capable of concurrently generating multiple, customized, instances of multivariant prognostic data reports in aircraft is desirable.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

A method for collecting parametric data for a vehicle having an onboard memory is provided. A plurality of data collection requests, each from one of a plurality of stakeholders, is received at the vehicle. A unique portion of the onboard memory is associated with each of the data collection requests. Concurrently, according to each of the data collection requests, parametric data is collected and recorded into the memory associated with each data collection request as a report.

A method for providing a primary stakeholder with a report of parametric data collected while a vehicle is in-service is also provided. A report configuration file representative of the primary stakeholder's data collection request is received prior to service, and an airline condition monitoring function (ACMF) representative of the primary stakeholder's report configuration file is generated. A unique portion of an onboard memory is associated with the primary stakeholder's ACMF. Data is collected according to the primary stakeholder's ACMF. The collected data is checked for completeness and recorded into the memory associated with the primary stakeholder as the primary stakeholder's data report.

A system for providing a primary stakeholder with a primary data report of parametric data collected from a vehicle is also provided. The system includes a primary ground base station tool for generating the primary stakeholder's data collection request. The vehicle is coupled to the primary ground base station tool and includes a memory device and a processor coupled to the memory device. The processor is configured to: 1) receive, prior to operation of the vehicle, the primary stakeholder's data collection request; 2) generate an ACMF representative of the primary stakeholder's data collection request; 3) associate a unique portion of the memory device with the primary stakeholder's ACMF; and 4) collect and record data into the memory associated with the primary stakeholder's ACMF as the primary data report.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived by referring to the following Detailed Description and Claims when considered in conjunction with the following figures, wherein like reference numerals refer to similar elements throughout the figures, and wherein:

DETAILED DESCRIPTION

The following Detailed Description is merely exemplary in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over any other implementations. Furthermore, there is no intention to be bound by any expressed or implied theory presented in the preceding Technical Field, Background, Brief Summary or the following Detailed Description.

For the sake of brevity, conventional techniques related to the transmittal of data, sensors, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following descriptions may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

The embodiment described herein is merely an example and serves as a guide for implementing the novel systems and method herein on any vehicle in any industrial, commercial, military, or consumer application. As such, the examples presented herein are intended as non-limiting.

Figure 1:
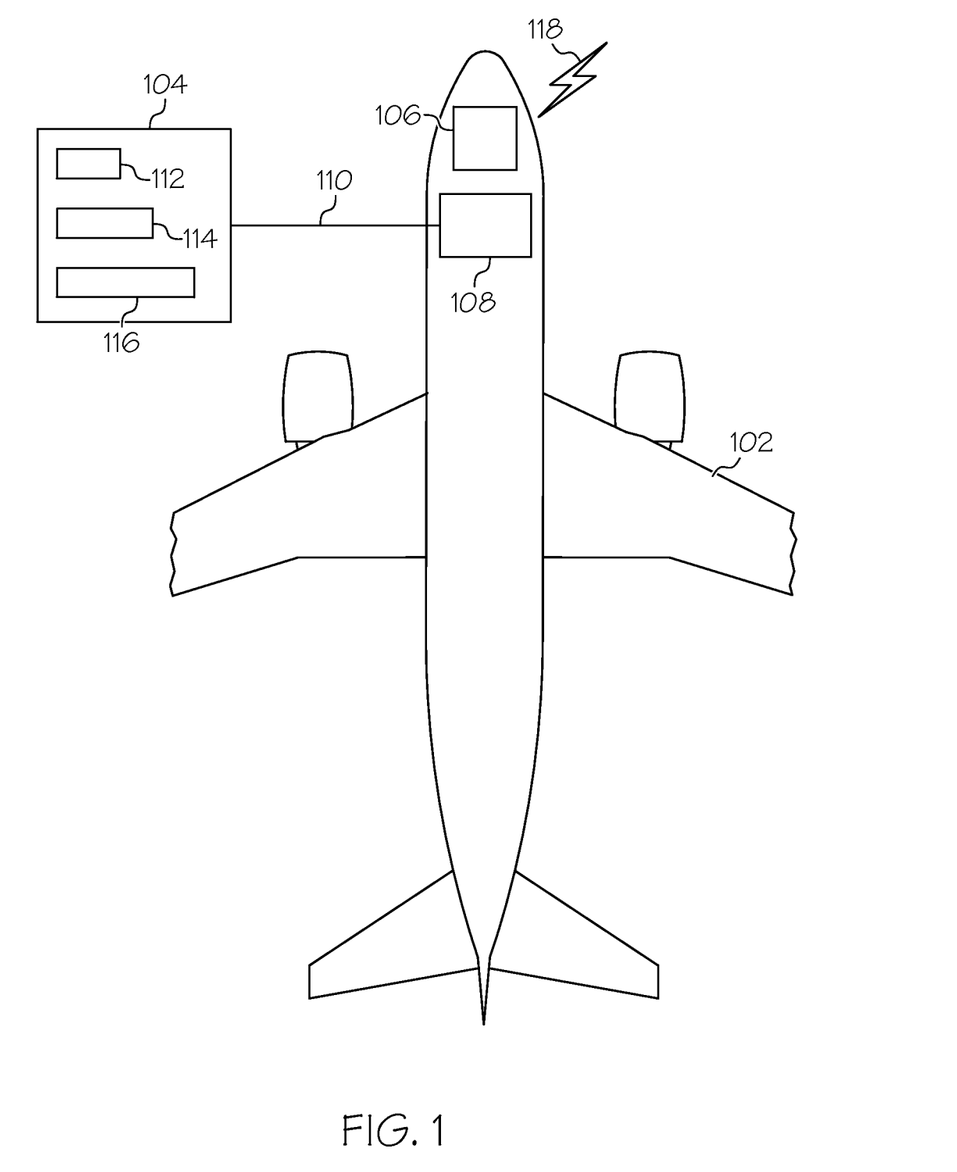
FIG. 1 is a simplified illustration of an aircraft and ground base station arranged according to an exemplary embodiment.

FIG. 1 is a simplified illustration of an aircraft 102 and ground base station 104 arranged according to an exemplary embodiment. Aircraft 102 includes a user interface 106 and a central maintenance computer 108. The central maintenance computer 108 is coupled via a ground line 110 to the ground base station 104. The central maintenance computer 108 typically includes a processor, user interface and memory, and is equipped to send and receive wireless communication 118.

The ground base station 104 may be a maintenance terminal where a ground base station tool is employed to generate a data collection request. The ground base station 104 includes a user interface 112, a processor 116 and a memory 114. At the ground base station 104, a stakeholder generates a data collection request using software that has been loaded into the memory 114. The data collection request and resulting data report are described as multivariant because they include multiple variables that have multiple degrees of freedom; typically, they include a continuous collection of a first set of data, as well as the identification of triggers or events that, if they occur, shall cause the collection of additional sets of data. The software at the ground base station is referred to as the ground base station tool (GBST); the GBST uses the stakeholder's data collection request to generate a report configuration file, which is a customized configuration file sometimes referred to as an airline modifiable input (AMI) file. The stakeholder's report configuration file, or AMI, may be transmitted wirelessly or via a ground line 110, CD, hard disk, USB stick, shop loader device, or similar device, to the aircraft cabinet while the remaining central maintenance computer 108 software is also being loaded.

There are two user interfaces, user interface 112 is located within the ground base station, and user interface 106 is located onboard the aircraft 102. User interface 106 and user interface 112 may include any combination of one or more of the following: a keypad, touchpad, keyboard, mouse, touchscreen, joystick, knob, microphone, speech or gesture recognition or another suitable device adapted to receive input from a user. A stakeholder submits a data collection request by operating a user interface, and requests a prognostic data report by operating a user interface.

For simplifying purposes, only one ground base station 104 is shown in FIG. 1. In practice, there may be multiple ground base stations, in multiple locations. Each ground base station is typically representative of a single stakeholder. As mentioned above, a stakeholder includes airline, aircraft OEMs, suppliers of parts, vehicle fleet operators, military and research personnel, or similar interested parties. Each stakeholder may individually obtain and implement the software required to transmit a data collection request (report configuration file) to the aircraft. Each stakeholder individually transmits a data collection request to the aircraft 102. Likewise, each stakeholder may similarly request the data report that was generated in response to the stakeholder's submitted AMI or report configuration file.

Wireless communication 118 includes aircraft communications addressing and reporting system (ACARS), satellite, and similar means of wireless transmissions. Retrieval of data reports is typically achieved via a ground line 110 at the completion of aircraft flight operations, or at the end of aircraft service. However, a stakeholder is able to request their associated data report via wireless communication 118, and/or while the aircraft is still in operation.

The processor 116 (and processor 202 described in connection with FIG. 2) may be implemented or realized with at least one general purpose processor, a content addressable memory, a digital signal processor, an application specific integrated circuit, a field programmable gate array, any suitable programmable logic device, discrete gate or transistor logic, discrete hardware components, or any combination designed to perform the functions described herein. A processor device may be realized as a microprocessor, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration.

The processor 116 (and processor 202 of FIG. 2) may include or cooperate with an appropriate amount of memory (for example memory 114), which can be realized as RAM memory, flash memory, EPROM memory, EEPROM memory, registers, a hard disk, a removable disk, a CD-ROM, or any other form of storage medium known in the art. In this regard, the memory can be coupled to the processor such that the processor can read information from, and write information to, the memory. In the alternative, the memory may be integral to the processor. In practice, a functional or logical module/component of the system described here might be realized using program code that is maintained in the memory, or in separately located memory. Moreover, the memory can be used to store data utilized to support the operation of the system, as will become apparent from the following description.

Figure 2:
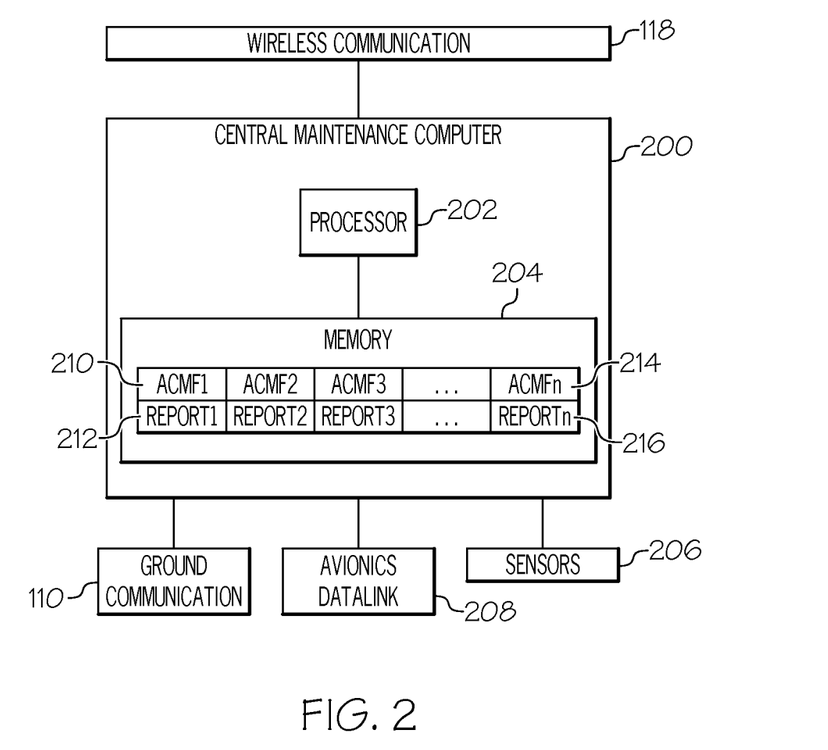
FIG. 2 is a system level block diagram of a central maintenance computer suitable for generating multiple instances of multivariant prognostic data reports according to an exemplary embodiment.

FIG. 2 is a system level block diagram of a central maintenance computer 200 suitable for generating multiple instances of multivariant prognostic data reports according to an exemplary embodiment. Central maintenance computer 200 includes processor 202 and memory 204. Sensors 206 and avionics data link 208 each supply aircraft data and information to the central maintenance computer 200. As described in association with FIG. 1, communication of data and information between the aircraft and stakeholders external to the aircraft may be transmitted wirelessly or via a ground line 110, CD, hard disk, USB stick, shop loader device, or similar device, to the aircraft cabinet of aircraft 102.

When a report configuration file, or airline modifiable input file (AMI), is received at the central maintenance computer 200, processor 202 partitions memory 204. Processor 202 initiates multiple instances of the airplane condition monitoring function (ACMF) that will be utilized to generate multiple prognostic reports; processor 202 then associates a partitioned range of memory with a customized instance of the ACMF that is configured according to each AMI or report configuration file. In this embodiment, a customized ACMF partition in memory is associated in a one to one relationship with each AMI received. In this manner, the memory 204 is populated with instances for ACMF1 (210) through ACMFn (214).

When the vehicle is in service, the embodiment concurrently collects and records multivariant parametric data as directed by the plurality of instances of the ACMF. Recorded data is captured in customized reports associated, one to one, with each instance of an ACMF. For example, report 1 (212) is associated with ACMF1 (210), etc., through report n (216) associated with ACMFn (214). In this manner, multiple customized multivariant prognostic reports are generated concurrently, significantly increasing turnaround time over the current approach. It is readily appreciated that the various stakeholders may have some redundancy between them with respect to their parametric data collection requests. Any redundancy is readily handled by this embodiment, as it concurrently populates the associated data reports with the requested parametric data.

In practice, the processor 202 may be realized as an onboard component of a vehicle (e.g., an onboard management system, central maintenance computer, a flight deck control system, a flight management system, or the like), or it may be realized in a portable computing device that is carried onboard the vehicle. For example, the processor 202 could be realized as the central processing unit (CPU) of a laptop computer, a tablet computer, or a handheld device. No matter how processor 202 is specifically implemented, it is in operable communication with one or more ground base stations (for example ground base station 104 in FIG. 1) during the transmission of a data collection request, and when a data report is extracted.

Sensors 206 include devices, instruments, and software for detecting status, temperature, faults, condition or any other aircraft data. The avionics data link 208 is a communication media having a bandwidth and sequencing protocol that allows transmission of data between electronic subsystem onboard the aircraft and also aircraft to ground exchange of data.

Figure 3:
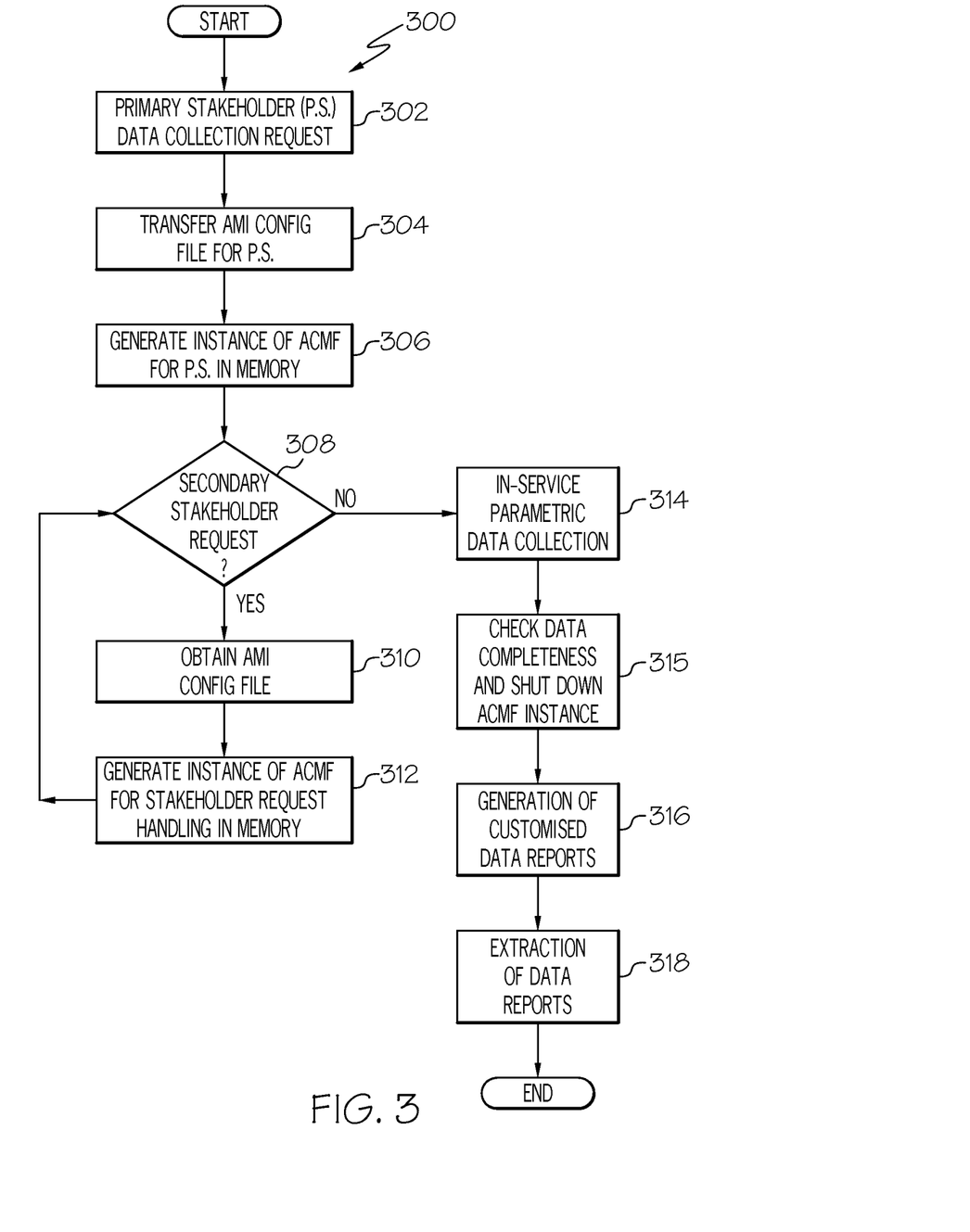
FIG. 3 is a flow chart describing steps of for generating multiple, customized, instances of multivariant prognostic data reports in a vehicle, in accordance with an exemplary embodiment.

FIG. 3 is a flow chart describing steps of a process 300 for generating multiple, customized, instances of multivariant prognostic data reports in a vehicle, in accordance with an exemplary embodiment. A data collection request selects, from among the thousands of data parameters (representing, for example, onboard instruments and equipment, line replacement units (LRU), altitude, temperature, operating speed, engine thrust, and the like), which parametric data to collect, and selects a strategy or sequence for data collection. In addition to selecting data parameters and strategies, a stakeholder may include a scheme for assigning one or more priority categories to data, and may define customized formatting for the organization of the parametric data in the data report. Working at a ground base station, a primary stakeholder (PS) formalizes all of the aforementioned selections into data collection request at STEP 302. Software at the ground base station generates a report configuration file, or airline modifiable input file (AMI), that is representative of the stakeholder's data collection request, and transfers the AMI or report configuration file for the PS in STEP 304.

Onboard the aircraft, a customized instance of the primary stakeholder's ACMF is generated based on the primary stakeholder's report configuration file or AMI, and the ACMF is stored in an associated partition in memory (STEP 306) as described hereinabove. If there is a secondary stakeholder request at STEP 308, a secondary AMI or report configuration file is obtained at step 310, and a secondary instance of the ACMF is generated (for the secondary stakeholder request) and stored in an associated partition in memory at STEP 312. STEPS 308 through 312 are continued until there are no additional stakeholder requests.

When the vehicle is in service, which is defined as including taxi operations, take-off operations, cruise operations, and landing operations, process 300 performs the parametric data collection at STEP 314. At the completion of parametric data collection, process 300 checks the collected data for completeness and shuts down the associated ACMF instances (STEP 315). As described above, the multiple customized data reports are concurrently populated with the requested multivariant parametric data at STEP 316. Extracting or receiving a customized data report is on a per-stakeholder request and typically occurs after the vehicle service is completed at STEP 318.

Using aircraft data obtained from the various sensors 206 and the avionics data link 208, processor 202 continuously monitors the eight thousand or more different aircraft parameters representing onboard instruments and equipment, line replacement units (LRU), altitude, temperature, operating speed, engine thrust, and the like. The embodiments generate multiple instances of customized prognostic data reports concurrently, decreasing turnaround time for stakeholders' data reports, increasing accessibility, and increasing stakeholder security. The data reports provide parametric that may be used to schedule aircraft maintenance and to provide insight into performance and troubleshooting.

Thus, there has been provided a method and system for concurrently generating multiple, customized, instances of multivariant prognostic data reports in aircraft.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for collecting data for a vehicle having an onboard memory and onboard processor, the method comprising:
receiving, by the processor onboard the vehicle, and prior to operation of the vehicle, a primary stakeholder's data collection request from a primary ground base station tool;
associating, by the processor, the primary stakeholder's data collection request with a unique portion of the onboard memory;
receiving, by the processor, and prior to operation of the vehicle, a secondary stakeholder's data collection request from a second ground base station tool;
associating, by the processor, the secondary stakeholder's data collection request with a unique portion of the onboard memory;
and
concurrently collecting and recording data into a primary data report responsive to the primary stakeholder's data collection request, and a secondary data report responsive to the secondary stakeholder's data collection request, wherein the primary data report and secondary data report are each stored into their associated unique portions of memory, and wherein the concurrent collection and recordation of data is performed by the processor during vehicle operation.

2. The method of claim 1, further comprising:
generating, by the primary stakeholder, a primary report configuration file representative of the primary stakeholder's data collection request;
generating, by the secondary stakeholder, a secondary report configuration file representative of the secondary stakeholder's data collection request; and
transmitting the primary and secondary report configuration files to the vehicle.

3. The method of claim 2, wherein the step of associating a portion of the memory further comprises generating a unique instance of an airline condition monitoring function (ACMF) that is representative of each report configuration file.

4. The method of claim 3, wherein the step of collecting and recording data comprises utilizing the unique a plurality of instances of ACMFs.

5. The method of claim 1, wherein collecting and recording parametric data comprises collecting data during at least one of: taxi operations, take-off operations, cruise operations, and landing operations.

6. The method of claim 5, further comprising a stakeholder extracting, after vehicle operations have ended, a data report associated with the respective stakeholder's data collection request.

7. The method of claim 5, further comprising a stakeholder extracting, during any vehicle operation, a data report associated with the respective stakeholder's data collection request.

8. The method of claim 1, wherein the step of receiving a data collection request further comprises instructing on what data to collect and when to collect the data.

9. The method of claim 1, further comprising assigning data to a priority category according to a predefined criticality scale.

10. The method of claim 1, wherein the step of receiving the primary stakeholder's data collection request and the secondary stakeholder's data collection request further comprises receiving at least one redundant datum collection request.

11. A method for providing a stakeholder with a report of parametric data collected while a vehicle is in-service, the method comprising:
receiving, at a processor onboard the vehicle, prior to vehicle service, a primary report configuration file from a primary ground base station tool, the primary report configuration file representative of a primary stakeholder's data collection request;
by the processor onboard the vehicle:
generating an airline condition monitoring function (ACMF) representative of the primary report configuration file;
associating a unique portion of an onboard memory with the primary stakeholder's ACMF;
receiving, prior to vehicle service, a secondary report configuration file from a second ground base station tool, the secondary report configuration file representative of a secondary stakeholder's data collection request;
generating an airline condition monitoring function (ACMF) representative of the secondary report configuration file;
associating, a unique portion of an onboard memory with the secondary stakeholder's ACMF;
concurrently collecting data according to the primary stakeholder's ACMF and secondary stakeholder's ACMF when the vehicle is in service; and
checking collected data for completeness and concurrently recording collected data into (i) the memory associated with the primary stakeholder as the primary stakeholder's data report, and (ii) the memory associated with the secondary stakeholder as the secondary stakeholder's data report.

12. The method of claim 11, further comprising extracting, by the primary stakeholder, the primary stakeholder's data report.

13. The method of claim 12, further comprising extracting, by the secondary stakeholder, the secondary stakeholder's data report.

14. The method of claim 12, wherein the the primary report configuration file and secondary report configuration file comprise at least one redundant datum request.

15. The method of claim 12, further comprising generating a plurality of instances of ACMFs.

16. A system for providing a stakeholder with a data report of parametric data collected from a vehicle, the system comprising:

a primary ground base station tool for providing a primary stakeholder's data collection request;

a second ground base station tool coupled to the vehicle for providing a secondary stakeholder's data collection request;

a vehicle coupled to the primary ground base station tool and second ground base station tool, comprising:

a memory device;

a processor coupled to the memory device and configured to: 1) receive, prior to operation of the vehicle, the primary stakeholder's data collection request 2) generate an airline condition monitoring function (ACMF) representative of the primary stakeholder's data collection request 3) associate a unique portion of the memory device with the primary stakeholder's ACMF; 4) collect and record data into the memory associated with the primary stakeholder's ACMF as the primary data report, according to the primary stakeholder's data collection request; and wherein the processor is further configured to: 1) receive, prior to operation of the vehicle, the secondary stakeholder's data collection request; 2) generate an ACMF representative of the secondary stakeholder's data collection request; 3) associate a unique portion of the memory device with the secondary stakeholder's data collection request; 4) collect and record data into memory associated with the secondary stakeholder's ACMF as the secondary data report concurrent with the collection and storage of data into the primary data report.

17. The system of claim 16, wherein the processor is further configured to transmit to the primary stakeholder the primary data report and to transmit to the secondary stakeholder the secondary data report.

* * * * *

UNITED STATES PATENT AND TRADEMARK OFFICE
CERTIFICATE OF CORRECTION

PATENT NO. : 9,336,632 B2
APPLICATION NO. : 14/462081
DATED : May 10, 2016
INVENTOR(S) : Pradeep Mahalingaiah et al.

Page 1 of 1

It is certified that error appears in the above-identified patent and that said Letters Patent is hereby corrected as shown below:

In the claims,

Column 7, line 62, "a plurality of" should be deleted.

Signed and Sealed this
Nineteenth Day of July, 2016

Michelle K. Lee
*Director of the United States Patent and Trademark Office*